US012619048B2

(12) United States Patent
Lee et al.

(10) Patent No.: US 12,619,048 B2
(45) Date of Patent: May 5, 2026

(54) LENS AND LENS MODULE HAVING THE SAME

(71) Applicant: SAMSUNG ELECTRO-MECHANICS CO., LTD., Suwon-si (KR)

(72) Inventors: Eun Chong Lee, Suwon-si (KR); Hwan Soo Park, Suwon-si (KR); Kyu Min Chae, Suwon-si (KR); Hyuk Joo Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 322 days.

(21) Appl. No.: 18/461,895

(22) Filed: Sep. 6, 2023

(65) Prior Publication Data

US 2024/0142744 A1 May 2, 2024

(30) Foreign Application Priority Data

| | | | |
|---|---|---|---|
| Oct. 27, 2022 | (KR) | .................. | 10-2022-0140428 |
| Nov. 3, 2022 | (KR) | .................. | 10-2022-0144846 |
| Apr. 25, 2023 | (KR) | .................. | 10-2023-0054192 |

(51) Int. Cl.
*G02B 7/02* (2021.01)

(52) U.S. Cl.
CPC ............. *G02B 7/028* (2013.01); *G02B 7/021* (2013.01)

(58) Field of Classification Search
CPC ........ G02B 7/022; G02B 7/021; G02B 7/028; G02B 7/026; G02B 7/02; H04N 23/55
See application file for complete search history.

(56) References Cited

U.S. PATENT DOCUMENTS

| | | | | |
|---|---|---|---|---|
| 2008/0037137 A1* | 2/2008 | Kodama | ................ | G02B 7/021 |
| | | | | 359/703 |
| 2008/0074763 A1* | 3/2008 | Jao | ......................... | H04N 23/57 |
| | | | | 359/811 |

(Continued)

FOREIGN PATENT DOCUMENTS

| | | | | | |
|---|---|---|---|---|---|
| CN | 106324949 A | * | 1/2017 | | |
| CN | 112558268 A | * | 3/2021 | ............. | G02B 7/021 |

(Continued)

OTHER PUBLICATIONS

Korean Office Action Issued on Feb. 4, 2025, in Counterpart Korean Patent Application No. 10-2023-0054192 (6 Pages in English, 6 Pages in Korean).

(Continued)

*Primary Examiner* — Ephrem Z Mebrahtu
(74) *Attorney, Agent, or Firm* — NSIP Law

(57) ABSTRACT

A lens module is provided. The lens module includes a first lens, a second lens, and a third lens sequentially disposed from an object side to an imaging side, a first spacing member disposed between the first lens and the second lens and having a first passage extending in a direction that intersects an optical axis, a second spacing member disposed between the second lens and the third lens and having a second passage extending in a direction that intersects the optical axis, and a lens barrel configured to accommodate the first lens, the second lens, the third lens, the first spacing member and the second spacing member, and configured to have a first connection passage disposed on an inner side surface and connected to the first passage and the second passage.

10 Claims, 7 Drawing Sheets

(56)     References Cited

U.S. PATENT DOCUMENTS

| | | | |
|---|---|---|---|
| 2014/0204476 A1 | 7/2014 | Takase et al. | |
| 2016/0356989 A1* | 12/2016 | Kubota ................... | G02B 9/62 |
| 2018/0372984 A1 | 12/2018 | Shirotori | |
| 2019/0346657 A1 | 11/2019 | Hayashi et al. | |
| 2023/0256693 A1 | 8/2023 | Ham et al. | |

FOREIGN PATENT DOCUMENTS

| | | | | | |
|---|---|---|---|---|---|
| JP | 2005-249994 A | | 9/2005 | | |
| JP | 2008-139559 A | | 6/2008 | | |
| KR | 10-2014-0086495 A | | 7/2014 | | |
| KR | 20210067232 A | * | 6/2021 | ............ | G02B 7/028 |
| KR | 10-2022-0038226 A | | 3/2022 | | |

OTHER PUBLICATIONS

Partial European search report issued on Mar. 5, 2024, in counterpart European Patent Application No. 23195746.5 (14 pages).

* cited by examiner

APsum = AP+AP+AP+AP

I-I

II-II 212  212
210
212  212

222  222
220
222  222

LENS AND LENS MODULE HAVING THE SAME

CROSS-REFERENCE TO RELATED APPLICATIONS

This application claims the benefit under 35 USC § 119(a) of Korean Patent Application Nos. 10-2023-0054192 filed on Apr. 25, 2023, 10-2022-0144846 filed on Nov. 3, 2022, and. 10-2022-0140428 filed on Oct. 27, 2022 in the Korean Intellectual Property Office, the entire disclosures of which are incorporated herein by reference for all purposes.

BACKGROUND

1. Field

The following description relates to a lens and a lens module including the lens.

2. Description of Related Art

Lenses are configured to converge incident light on a specific area or diverge the light to a wide area. A lens may have a predetermined thickness which enables the convergence or divergence of light. In an example, a lens (for example, a lens having positive refractive power) configured to converge light may have a thick center (optical axis area) of the lens, and a lens (for example, a lens having negative refractive power) configured to emit light may have a thick edge portion of the lens. Accordingly, heat transfer between a first side surface (e.g., an outer surface) and a second side surface (e.g., an inner surface) of the lens may be difficult due to the thickness of the lens. Additionally, since the edge of the lens is typically sealed to prevent unnecessary light from passing therethrough, thermal convection between a first side (e.g., outer surface) and a second side surface (e.g., inner surface) of the lens may not occur easily.

However, since a first side (e.g., outer surface) of the lens may always be exposed externally, unlike a second side of the lens, condensation may likely occur on one surface of the lens due to a temperature differential between a first side and a second side of the lens. Additionally, dew condensation of the lens hinders the transmission of light, and thus the resolution of the lens and the lens module including the lens may be hindered.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a lens includes a lens unit having refractive power; a flange portion disposed at an edge of the lens unit; and protrusions disposed on the flange portion at a first interval (G) in a circumferential direction and configured to form a passage connecting an object-side space and/or an image-side space of the lens unit and an outer space of the flange portion, wherein the first interval (G) and a distance (Rmax) from a center of an optical axis of the lens unit to an outermost point of the flange portion satisfy a conditional expression $0.26 < G/Rmax < 0.5$.

$$0.06 < APsum/AL < 0.1,$$

where APsum is a sum of cross-sectional areas of the protrusions, and AL is a cross-sectional area of the lens unit.

The lens unit may have a positive refractive power or a negative refractive power.

At least one of an object-side surface and an image-side surface of the lens unit may be concave.

The protrusions may be disposed at a higher level than the lens unit in an optical axis direction.

A lens module may include the lens, and a lens barrel configured to accommodate the lens and having a groove disposed in an inner side surface of the lens barrel and connected to the passage.

An electronic device may include the lens.

In a general aspect, a lens module includes a first lens, a second lens, and a third lens sequentially disposed from an object side to an imaging side; a first spacing member, disposed between the first lens and the second lens, and having a first passage that extends in a direction that intersects an optical axis; a second spacing member, disposed between the second lens and the third lens, and having a second passage that extends in the direction that intersects the optical axis; and a lens barrel configured to accommodate the first lens, the second lens, the third lens, the first spacing member and the second spacing member, and configured to have a first connection passage disposed on an inner side surface and connected to the first passage and the second passage.

The first passage may be disposed at predetermined intervals in a circumferential direction of the first spacing member.

A length of the first spacing member in the optical axis direction may be less than a length of the second spacing member in the optical axis direction.

A maximum distance from an image-side surface of the first lens to an object-side surface of the second lens may be less than a maximum distance from an image-side surface of the second lens to an object-side surface of the third lens.

An image-side surface of the first lens and an object-side surface of the second lens may be respectively concave.

The lens module may further include a fourth lens disposed on an image side of the third lens; and a third spacing member disposed between the third lens and the fourth lens, and having a third passage that extends in a direction that intersects the optical axis.

A maximum distance from an image-side surface of the first lens to an object-side surface of the second lens may be less than a maximum distance from an image-side surface of the third lens to an object-side surface of the fourth lens.

A second connection passage connecting the first passage and the third passage may be provided on the inner side surface of the lens barrel.

A third connection passage connecting the second passage and the third passage may be provided on the inner side surface of the lens barrel.

At least one of the first to fourth lenses has a passage, and satisfies a conditional expression $0.06 < APsum/AL < 0.1$, where APsum is a sum of cross-sectional areas of the protrusions, and AL is a cross-sectional area of the lens unit.

An electronic device may include the lens module.

Other features and aspects will be apparent from the following detailed description, the drawings, and the claims.

Figure 1:
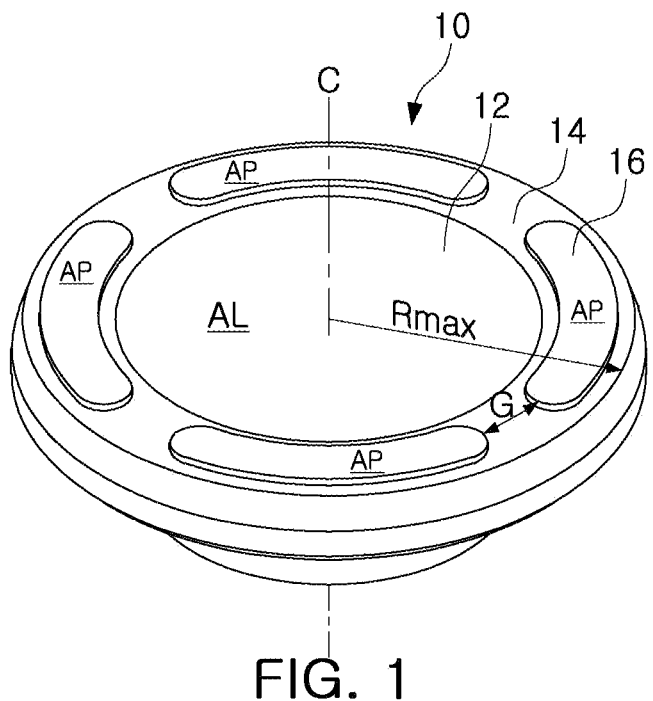
FIG. 1 illustrates a perspective view of an example lens, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

A lens according to an embodiment may be configured to allow the circulation of air formed on one side. For example, the lens may be configured such that air formed on the object-side surface or air formed on the image-side surface of the lens is discharged externally. The lens may include a lens unit, a flange portion, and a protrusion. The lens unit may be configured to have refractive power. For example, at least one of an object-side surface and an image-side surface of the lens unit may be formed as a curved surface. Alternatively, the flange portion may have a substantially flat shape on the object-side surface and the image-side surface such that light may be transmitted or reflected as it is. As another example, the lens unit may be transparent to allow light to be refracted and transmitted, and the flange portion may be coated with a light-blocking material to prevent light from being transmitted. The lens unit and the flange portion may be formed in different positions around the optical axis. For example, the lens unit may be formed in a paraxial region including the optical axis, and the flange portion may be formed in an edge region spaced apart from the optical axis by a predetermined distance. As another example, the lens unit may be formed in the central region of the lens, and the flange portion may be formed around the periphery (edge) of the lens unit.

The protrusion may be configured such that air formed on one side of the lens unit may be circulated or exhausted in a direction intersecting the optical axis without interfering with the optical performance of the lens. Accordingly, protrusions may be formed on the flange portion. As a detailed example, referring to FIG. 2, the protrusions may be formed at a first interval (G) in the circumferential direction of the flange portion. The protrusions formed in this manner may form a passage connecting the object-side space or image-side space of the lens unit and the outer space of the flange portion in the laminated structure between the lens and the lens or between the lens and other members.

A lens according to an embodiment may satisfy a predetermined conditional expression such that smooth air circulation through the protrusion may be obtained. For example, the lens may satisfy conditional expression $0.26 < G/Rmax < 0.5$ regarding the distance (Rmax) from the center of the optical axis of the lens unit to the outermost point of the flange portion and the first interval (G).

A lens module according to an embodiment may include a plurality of lenses. For example, the lens module may include a first lens, a second lens, and a third lens sequentially disposed from the object. However, the number of lenses included in the lens module is not limited to three. For example, the lens module may further include a fourth lens disposed on the image-side of the third lens, or may further include two or more lenses sequentially disposed on the image-side of the third lens.

A lens module according to an embodiment may include one or more spacing members disposed between the lenses. For example, the lens module may include a first spacing member disposed between the first lens and the second lens, and a second spacing member disposed between the second lens and the third lens. In the lens module according to an embodiment, the first spacing member and the second spacing member may include a configuration for circulating or exhausting air in a direction intersecting the optical axis. For example, a first passage and a second passage extending in a direction intersecting the optical axis may be formed in the first spacing member and the second spacing member, respectively.

In the lens module according to an embodiment, the first passage and the second passage may be formed as a plurality of passages. For example, two or more first passages may be formed at a first interval in the circumferential direction of the first spacing member, and two or more second passages may be formed at a predetermined second interval in the circumferential direction of the second spacing member. However, the number of first and second passages is not limited to two, respectively.

A lens module according to an embodiment may include a configuration for accommodating a plurality of lenses and a plurality of spacing members. For example, a lens module may include a lens barrel. The lens barrel may be configured to accommodate the lens and the spacing member therein. For example, the lens barrel may be configured to accommodate a first lens, a first spacing member, and a second lens sequentially disposed along an optical axis. As another example, the lens barrel may be configured to accommodate all of a first lens, a first spacing member, a second lens, a second spacing member, and a third lens sequentially disposed along the optical axis. The lens barrel may include a configuration connecting a plurality of passages. For example, a first connection passage connected to the first passage and the second passage may be formed on the inner side surface of the lens barrel.

In the lens module configured as above, since the first space between the first lens and the second lens and the second space between the second lens and the third lens are connected through the first passage, the second connection passage, and the second passage, a phenomenon in which the temperature of the first space or the second space is rapidly heated or cooled may be reduced.

One or more examples provide a lens configured to implement a constant resolution even at high temperature and high humidity environment and a lens module including the same.

One or more examples may provide a lens configured to prevent deterioration in light transmission due to moisture or the like in a high temperature and high humidity environment, and a lens module including the same.

Figure 2:
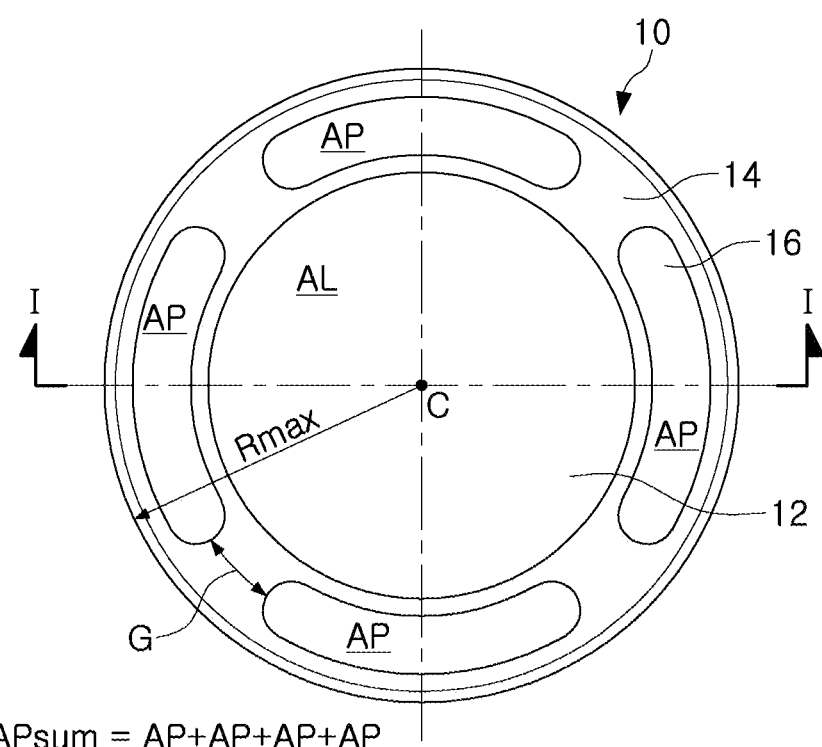
FIG. 2 illustrates a plan view of the example lens illustrated in FIG. 1.
Figure 3:
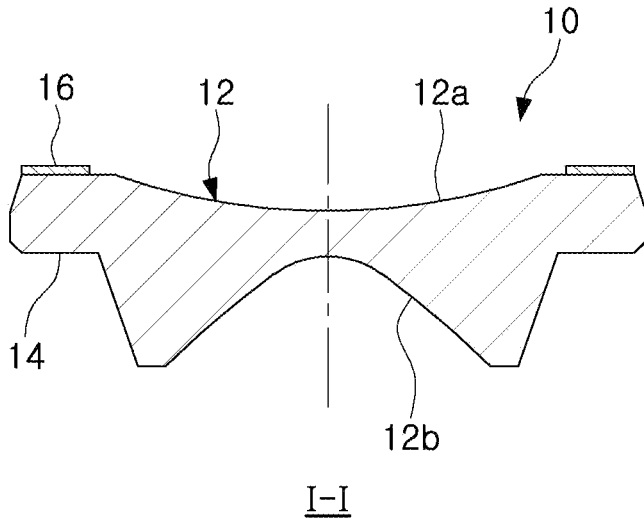
FIG. 3 illustrates a cross-sectional view I-I of the example lens illustrated in FIG. 2.

First, an example lens, in accordance with one or more embodiments will be described with reference to FIGS. 1 to 3.

A lens 10, in accordance with one or more embodiments, may include a lens unit 12, a flange portion 14, and one or more protrusions 16. However, the configuration of the lens 10 according to the present embodiment is not limited to the lens unit 12, the flange portion 14, and the one or more protrusions 16.

The lens unit 12 may be configured to have refractive power. For example, the lens unit 12 may have positive or negative refractive power to converge or diverge incident light. Accordingly, referring to FIG. 3, at least one of an object-side surface 12a and an image-side surface 12b of the lens unit 12 may be convex or concave.

As a detailed example, the lens unit 12 may have a shape in which the object-side surface 12a is convex and the image-side surface 12b is concave. As another example, the lens unit 12 may have a shape in which the object-side surface 12a is concave and the image-side surface 12b is concave. However, the shape of the lens unit 12 is not limited to the above-described illustrative form.

The flange portion 14 is formed at an edge of the lens unit 12 and is configured to support the lens unit 12. For example, the flange portion 14 may be coupled to the lens barrel or may contact the inner side surface of the lens barrel such that the lens unit 12 may be fixed in a position within the lens barrel. The flange portion 14 may be configured to absorb, reflect, or scatter incident light. In an example, the flange portion 14 may be coated in black to generally absorb incident light. In another example, the flange portion 14 may be formed to have a form having a predetermined roughness such that incident light is not reflected to the lens unit 12. In another example, the object-side surface of the flange portion 14 may be formed to be substantially flat to reflect incident light as it is.

The protrusion 16 may be formed on the flange portion 14. For example, the protrusion 16 may be formed on at least one of an object-side surface and an image-side surface of the flange portion 14. In an example, the protrusion 16 may be formed as a plurality of protrusions on one surface of the flange portion 14. For example, two or more protrusions 16 may be formed at a first interval G in the circumferential direction of the flange portion 14. In an example, the protrusion 16 may be formed at a level that is higher in the optical axis direction than the lens unit 12. For example, the protrusion 16 formed on the object-side surface of the flange portion 14 may protrude higher toward the object than the object-side surface of the lens unit 12. As another example, the protrusion 16 formed on the image-side surface of the flange portion 14 may be formed higher toward the image than the image-side surface of the lens unit 12. The plurality of protrusions 16 may form passages extending in a direction intersecting the optical axis of the lens unit 12. The passage may connect the space formed on the object-side surface or image-side surface of the lens unit 12 and the outer space of the flange portion 14.

The first interval G between a first protrusion 16 and a second protrusion 16 may have a predetermined numerical relationship with a maximum radius (for example, a distance from the center of the optical axis of the lens unit to an outermost point of the flange portion: Rmax) of the lens 10. For example, the first interval G and the maximum radius Rmax of the lens 10 may satisfy the conditional expression $0.26 < G/Rmax < 0.5$.

The size (area) occupied by the protrusion 16 on the flange portion 14 may be changed depending on the size (area) of the lens unit 12. For example, the sum (APsum) of the cross-sectional areas (the area of a plane perpendicular to the optical axis) of the protrusions 16 formed on one surface of the flange portion 14, and the cross-sectional area (the area of a plane perpendicular to the optical axis: AL) of the lens unit 12 may satisfy the conditional expression $0.06 < APsum/AL < 0.1$.

In the lens 10 formed as described above, high temperature and high humidity air formed around the lens unit 12

(object side or image side) may be discharged to the outside of the flange portion 14 through the passage, and thus condensation that may be caused due to the temperature deviation may be suppressed or reduced.

Next, an example lens, in accordance with one or more embodiments, will be described with reference to FIGS. 4 and 5.

Figure 4:
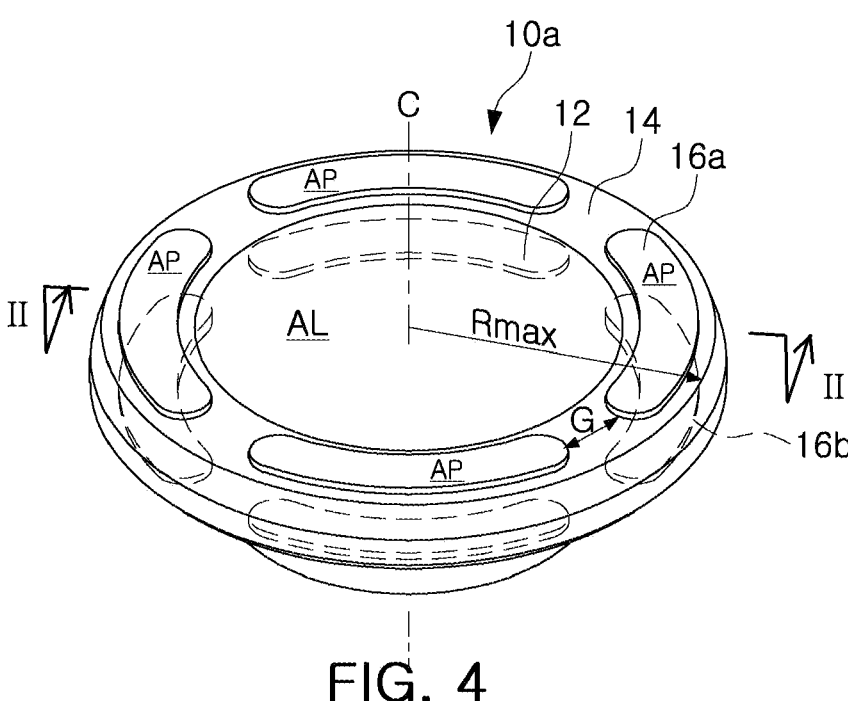
FIG. 4 illustrates a perspective view of an example lens, in accordance with one or more embodiments.
Figure 5:
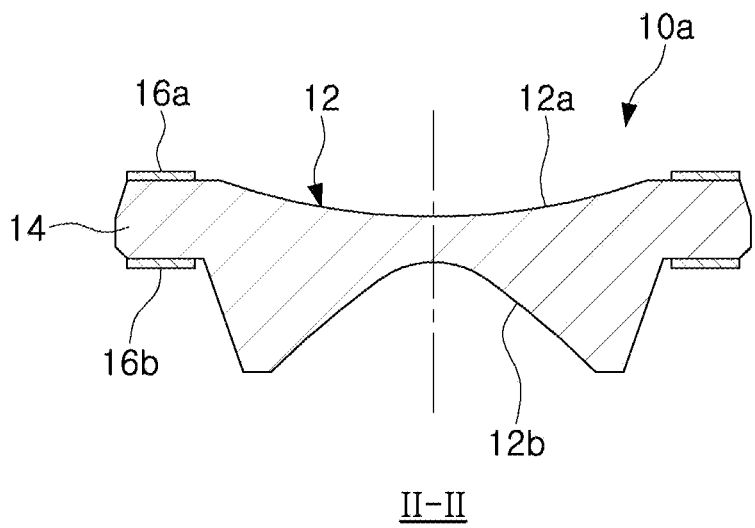
FIG. 5 illustrates a cross-sectional view of the example lens illustrated in FIG. 4.

Referring to FIG. 4, a lens 10a, in accordance with one or more embodiments, may include a lens unit 12, a flange portion 14, and one or more protrusions 16. However, the configuration of the lens 10a according to the present embodiment is not limited to the lens unit 12, the flange portion 14, and the protrusion 16.

The lens unit 12 may be configured to have refractive power. For example, the lens unit 12 may have positive or negative refractive power to converge or diverge incident light. Accordingly, at least one of the object-side surface 12a and the image-side surface 12b of the lens unit 12 may be convex or concave. As a detailed example, the lens unit 12 may have a shape in which the object-side surface 12a is convex and the image-side surface 12b is concave. As another example, the lens unit 12 may have a shape in which the object-side surface 12a is concave and the image-side surface 12b is concave. However, the shape of the lens unit 12 is not limited to the above-described illustrative form.

The flange portion 14 may be formed at an edge of the lens unit 12 and may be configured to support the lens unit 12. For example, the flange portion 14 may be coupled to the lens barrel or may contact the inner side surface of the lens barrel such that the lens unit 12 may be fixed in a position within the lens barrel. The flange portion 14 may be configured to absorb, reflect, or scatter incident light. For example, the flange portion 14 may be coated in black to substantially absorb incident light. As another example, the flange portion 14 may be formed to have a predetermined roughness such that incident light is not reflected to the lens unit 12. As another example, the object-side surface of the flange portion 14 may be formed to be substantially flat to reflect incident light as it is.

The protrusion 16 may be formed on the flange portion 14. In an example, the protrusion 16 may be formed on both the object-side surface and the image-side surface of the flange portion 14. The protrusion 16 may be provided as a plurality of protrusions on one surface of the flange portion 14. For example, two or more protrusions 16 may be formed at a first interval G in the circumferential direction of the flange portion 14. The protrusion 16 may be formed to be at a higher level in the optical axis direction than the lens unit 12. For example, the protrusion 16 formed on the object-side surface of the flange portion 14 may protrude at a higher level toward the object than the object-side surface of the lens unit 12, and the protrusion 16 formed on the image-side surface of the flange portion 14 may be formed to be at a higher level toward the image than the image-side surface of the lens unit 12. However, the protrusion 16 is not necessarily formed at a higher level than a convex shape of the lens unit 12.

The plurality of protrusions 16 may form passages that extend in a direction intersecting the optical axis of the lens unit 12. The passages may connect a space formed on an object-side surface or an image-side surface of the lens unit 12 and an outer space of the flange portion 14.

In the lens 10a formed as described above, high temperature and high humidity air formed on the object side and the image side of the lens unit 12 may be discharged to the outside of the flange portion 14 through the passages formed by the protrusions 16, and thus, condensation that may be caused by a temperature deviation may be suppressed or reduced.

An example of a lens module including a lens, in accordance with one or more embodiments, will be described with reference to FIG. 6.

Figure 6:
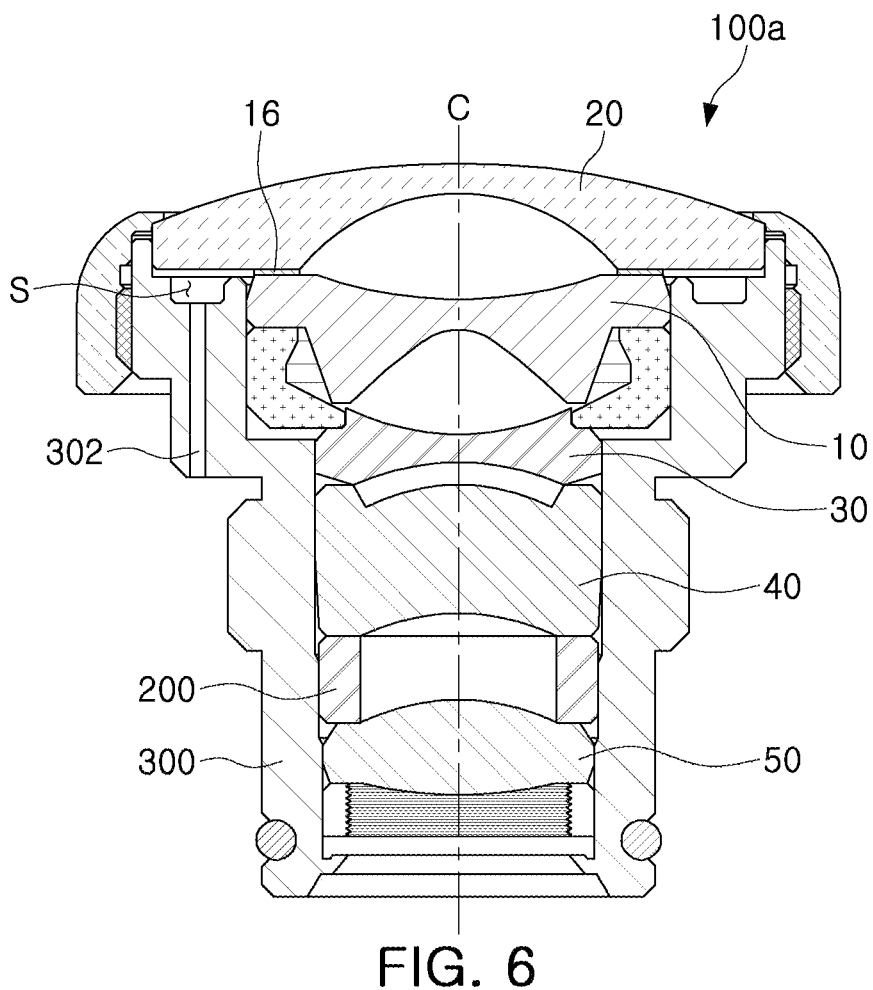
FIG. 6 illustrates a cross-sectional view of an example lens module including the example lens illustrated in FIG. 1.

Referring to FIG. 6, in an example, the lens module 100*a* may include a plurality of lenses 10, 20, 30, 40, and 50 and a lens barrel 300. However, the configuration of the lens module 100*a* is not limited to the lenses 10, 20, 30, 40, and 50 and the lens barrel 300. For example, the lens module 100*a* may further include a spacing member 200 disposed between the lens 40 and the lens 50.

The plurality of lenses 10, 20, 30, 40, and 50 may be sequentially disposed along the optical axis C. For example, the first lens 20, the second lens 10, the third lens 30, the fourth lens 40, and the fifth lens 50 may be sequentially disposed along the optical axis C. For reference, although five lenses are illustrated as sequentially disposed along the optical axis C in FIG. 6, the number of lenses constituting the lens module 100*a* is not limited to five. For example, the lens module 100*a* may be comprised of the first lens 20, the second lens 10, the third lens 30, and the fourth lens 40 sequentially disposed along the optical axis C.

At least one of the first lens 20, the second lens 10, the third lens 30, the fourth lens 40, and the fifth lens 50 may be configured in the same or similar form as the lens illustrated in FIG. 1 or FIG. 4. For example, the second lens 10 may have the same or similar configuration as the lens illustrated in FIG. 1. As another example, the third lens 30 may be configured the same as, or similar to, the lens illustrated in FIG. 4.

The lens module 100*a* may include a configuration that discharges air between the lens 20 and the lens 10 to the outside of the lens 20 or to the outside of the lens module 100*a*. For example, a groove S of a predetermined size, or a discharge path 302, may be formed in the lens barrel 300.

In the lens module 100*a* configured as above, occurrence of dew condensation on the surface of the first lens 20 or the formation of frost or water droplets on the inside side of the first lens 20 due to a rapid temperature differences may be significantly reduced. For example, the high temperature and high humidity air formed between the lens 20 and the lens 10 may be discharged into the groove S of the lens barrel 300 through a passage formed between the first protrusion 16 and the second protrusion 16, or may be discharged externally through the groove S and the discharge path 302. In another example, the external low-temperature and low-humidity air is introduced into the space between the lens 20 and the lens 10 through the discharge path 302, the groove S, and the passage between the protrusion 16 and the protrusion 16, thereby lowering the temperature and humidity of the space.

Next, an example lens module, in accordance with one or more embodiments, will be described with reference to FIG. 7, FIG. 8A, and FIG. 8B.

The lens module 100, in accordance with one or more embodiments, may include a plurality of lenses. For example, the lens module 100 may include a first lens 10, a second lens 20, and a third lens 30 sequentially disposed from the object side to the imaging side. However, the number of lenses constituting the lens module 100 is not limited to three. For example, the lens module 100 may include four or more lenses.

The first lens 10 to the third lens 30 may be disposed at predetermined intervals. For example, the first lens 10 to the third lens 30 may be disposed such that adjacent surfaces (the object-side surface and image-side surface) do not contact each other. The first lens 10 to the third lens 30 may be configured to have a unique arrangement relationship or size relationship. For example, a maximum distance D12 from the image-side surface of the first lens 10 to the object-side surface of the second lens 20 may be less than a maximum distance D23 from the image-side surface of the second lens 20 to the object-side surface of the third lens 30. As another example, the volume of a first space A12 formed between the first lens 10 and the second lens 20 may be smaller than the volume of a second space A23 formed between the second lens 20 and the third lens 30. The first space A12 may be formed by the concave surface of the lens. For example, the image-side surface of the first lens 10 and the object-side surface of the second lens 20 may be concave.

The lens module 100 may include a plurality of spacing members. For example, the lens module 100 may include a first spacing member 210 disposed between the first lens 10 and the second lens 20, and a second spacing member 220 disposed between the second lens 20 and the third lens 30. The first spacing member 210 and the second spacing member 220 may have different sizes. For example, the length of the first spacing member 210 in the optical axis direction may be less than the length of the second spacing member 220 in the optical axis direction.

A passage connected to the space between the lenses 10 and 20 and the lenses 20 and 30 may be formed in the first spacing member 210 and the second spacing member 220. For example, a first passage 212 connected to the first space A12 may be formed in the first spacing member 210 (see FIG. 8A), and a second passage 222 connected to the second space A23 may be formed in the second spacing member 220 (see FIG. 8B). The first passage 212 and the second passage 222 may be formed in the circumferential direction of the first spacing member 210 and the second spacing member 220. For example, the first passages 212 may be formed at intervals in the circumferential direction of the first spacing member 210, and the second passages 222 may be formed at intervals in the circumferential direction of the second spacing member 210. The first passage 212 and the second passage 222 may be configured such that air flows in a direction intersecting the optical axis. For example, the first passage 212 and the second passage 222 may be formed in a direction intersecting the optical axis of the lens as illustrated in FIG. 8.

Referring again to FIG. 7, the lens module 100 may include a lens barrel 300. For example, the lens module 100 may include the lens barrel 300 configured to accommodate the plurality of lenses 10, 20, and 30 and the plurality of spacing members 210 and 220. The lens barrel 300 may be configured to connect the first passage 212 and the second passage 222. For example, a first connection passage 310 connecting one end of the first passage 212 and one end of the second passage 222 may be formed on an inner side surface of the lens barrel 300. The first connection passage 310 may be in the form of a groove formed in the longitudinal direction of the lens barrel 300.

In the lens module 100 configured as above, air circulation between the first space A12 and the second space A23 may be obtained. For example, the air formed in the first space A12 sequentially moves through the first passage 212, the first connection passage 310, and the second passage 222, and may be mixed with the air in the second space A23. As another example, the air formed in the second space A23 sequentially moves through the second passage 222, the first connection passage 310, and the first passage 212, and may be mixed with the air in the first space A12.

Therefore, in the lens module 100 according to the present embodiment, even in the example in which the first lens 10 is rapidly heated or cooled by the temperature change of the external environment, a temperature change between the first lens 10 and the first space A12 may be significantly reduced through air circulation between the first space A12 and the second space A23. Specifically, in the lens module 100 according to the present embodiment, since the volume of the second space A23 is larger than the volume of the first space A12, rapid temperature changes in the first lens 10 and the first space A12 may be quickly and stably reduced.

Figure 9:
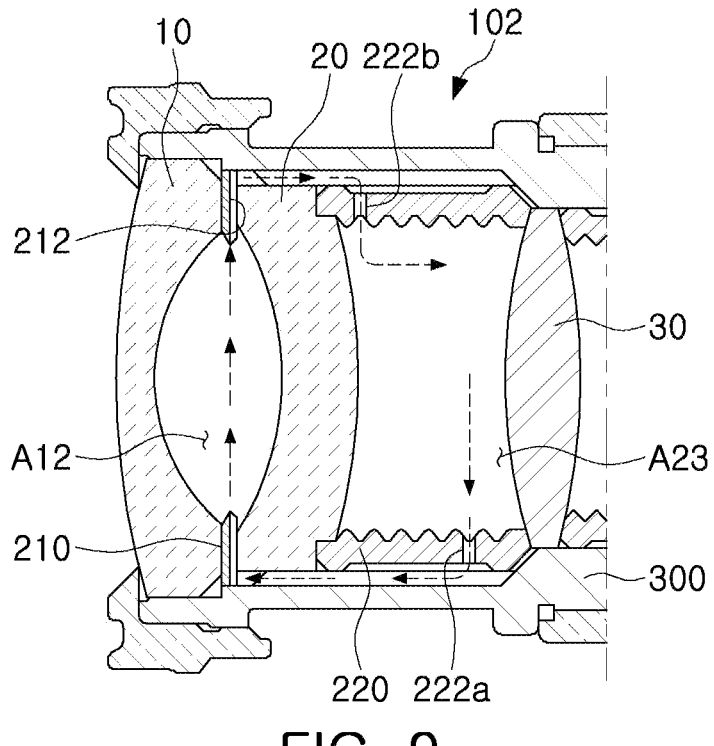
FIG. 9 illustrates a cross-sectional view according to a modified form of the example lens module illustrated in FIG. 7.

Next, a modified form of the lens module illustrated in FIG. 7 will be described with reference to FIG. 9. For reference, since the lenses 10, 20, and 30, the first spacing member 210, and the lens barrel 300 of the lens module 102 according to the modified example of FIG. 7 are the same as or similar to those of the above-described embodiment, a detailed description of these components is omitted.

Figure 7:
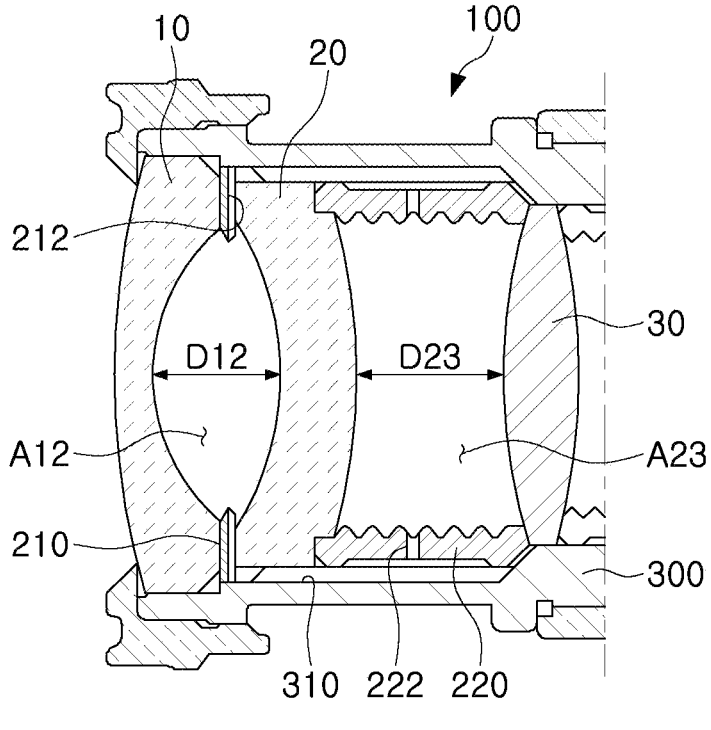
FIG. 7 illustrates a cross-sectional view of an example lens module, in accordance with one or more embodiments.
Figure 8A:
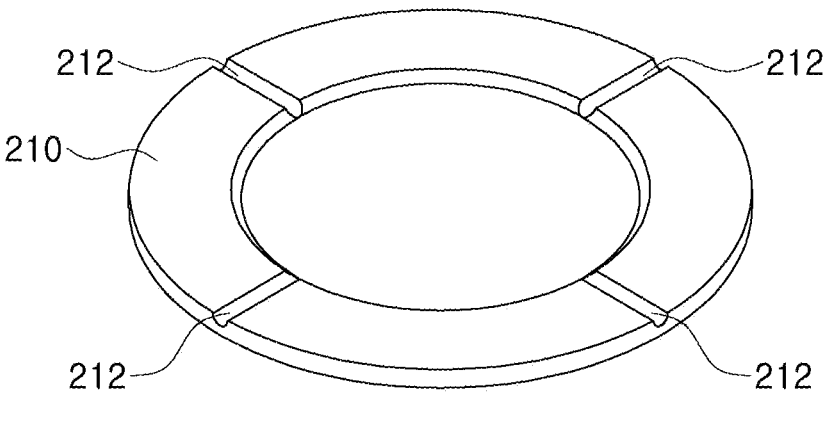
FIG. 8A and FIG. 8B illustrate a perspective view of an example spacing member illustrated in FIG. 7.
Figure 8B:
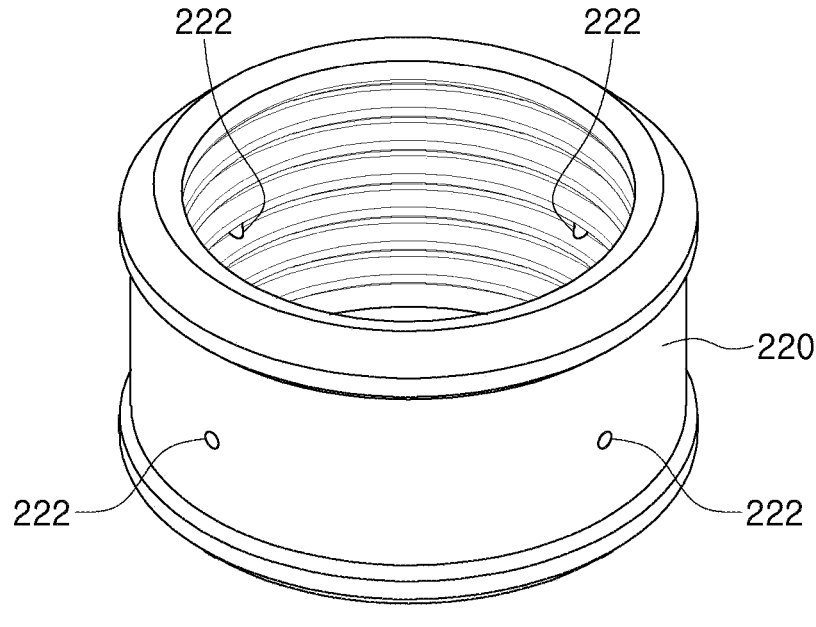

Referring to FIG. 7, the lens module 102 according to this form may be distinguished from the above-described embodiment in the form of the second spacing member 220. For example, the second spacing member 220 according to the present embodiment may include a plurality of second passages 222a and 222b formed in different positions as illustrated in FIG. 9. The second passage 222a and the second passage 222b may be formed to be positioned at different distances from the first passage 212. For example, a distance in the optical axis direction from the first passage 212 to the second passage 222a may be greater than a distance in the optical axis direction from the first passage 212 to the second passage 222b.

In the lens module 102 formed as above, a pressure difference or temperature difference between one side (the upper side of FIG. 9) of the first space A12 and the second space A23 and the other side (the lower side of FIG. 9) of the first space A12 and the second space A23 may be caused, and thus, air circulation between the first space A12 and the second space A23 may be performed quickly and smoothly.

Next, an example lens module, in accordance with one or more embodiments, will be described with reference to FIG. 10.

Figure 10:
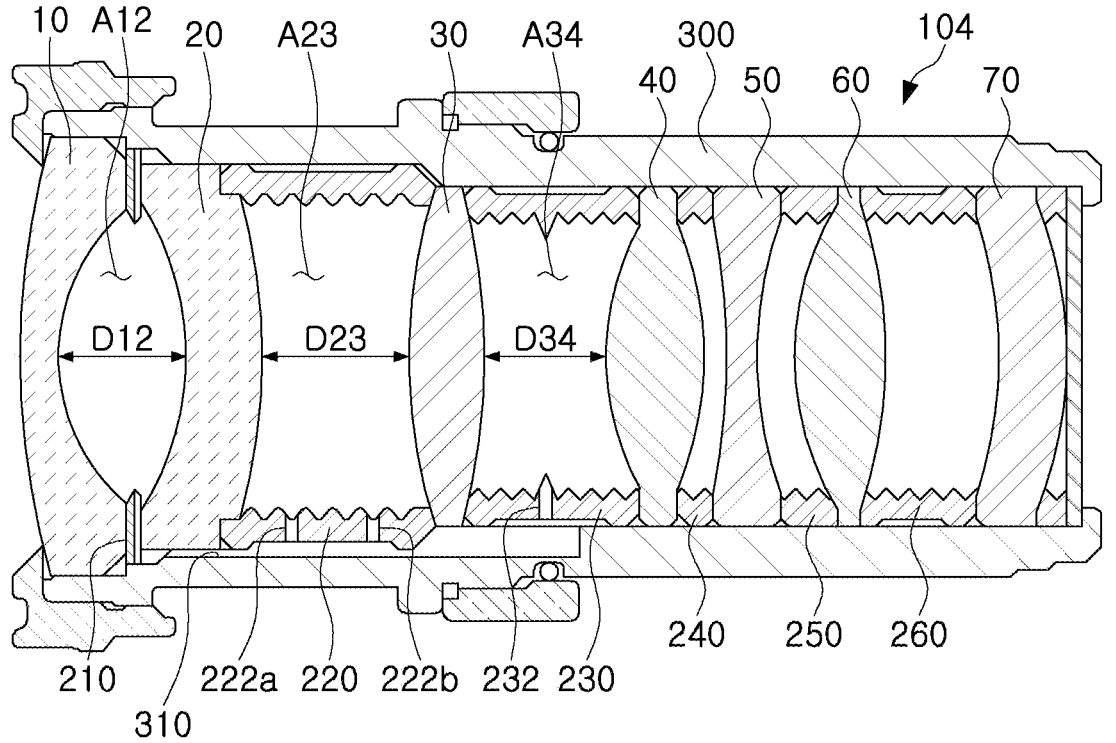
FIG. 10 illustrates a cross-sectional view of an example lens module, in accordance with one or more embodiments.

Referring to FIG. 10, a lens module 104, in accordance with one or more embodiments, may include a plurality of lenses. In an example, the lens module 104 may include a first lens 10, a second lens 20, a third lens 30, a fourth lens 40, a fifth lens 50, a sixth lens 60, and a seventh lens 70 disposed sequentially from the object side to the imaging side.

The first lens 10 to the seventh lens 70 may be disposed at predetermined intervals. For example, the first lens 10 to the third lens 70 may be disposed such that adjacent surfaces (object-side surface and image-side surface) do not contact each other. The first lens 10 to the fourth lens 40 may be configured to have a unique arrangement relationship or size relationship. For example, a maximum distance D12 from the image-side surface of the first lens 10 to the object-side surface of the second lens 20 may be less than a maximum distance D23 from the image-side surface of the second lens 20 to the object-side surface of the third lens 30. In another example, a maximum distance D12 from the image-side surface of the first lens 10 to the object-side surface of the second lens 20 may be less than or equal to a maximum distance D34 from the image-side surface of the third lens 30 to the object-side surface of the fourth lens 40. In another example, the volume of the first space A12 formed between the first lens 10 and the second lens 20 may be smaller than the volume of the second space A23 formed between the second lens 20 and the third lens 30. In another example, the volume of the first space A12 formed between the first lens 10 and the second lens 20 may be smaller than the volume of the third space A34 formed between the third lens 30 and the fourth lens 40.

The lens module 104 may include a plurality of spacing members. For example, the lens module 104 may include a first spacing member 210 disposed between the first lens 10 and the second lens 20, a second spacing member 220 disposed between the second lens 20 and the third lens 30, and a third spacing member 230 disposed between the third lens 30 and the fourth lens 40. Additionally, the lens module 104 may further include a fourth spacing member 240 disposed between the fourth lens 40 and the fifth lens 50, a fifth spacing member 250 disposed between the fifth lens 50 and the sixth lens 60, and a sixth spacing member 260 disposed between the sixth lens 60 and the seventh lens 70.

One or more passages 212, 222a, 222b, and 232 extending in a direction intersecting the optical axis may respectively be formed in the first spacing member 210 to the third spacing member 230. For example, a first passage 212 connected to the first space A12 is formed in the first spacing member 210, and second passages 222a and 222b connected to the second space A23 are formed in the second spacing member 220, and a third passage 232 connected to the third space A34 may be formed in the third spacing member 230.

The lens module 104 may include a lens barrel 300. For example, the lens module 104 may include the lens barrel 300 configured to accommodate the first lens 10 to the seventh lens 70 and the first spacing member 210 to the sixth spacing member 260. The lens barrel 300 may be configured to connect the first to third passages 212 to 232. For example, a first connection passage 310 configured to be connected to one ends of the first passage 212 to the third passage 232 may be formed on an inner side surface of the lens barrel 300. The first connection passage 310 may be in the form of a groove formed long in the longitudinal direction of the lens barrel 300.

In the lens module 104 configured as above, since the first space A12 to the third space A34 are connected to the first passage 212 to the third passage 232 by the first connection passage 310, air circulation between the first space A12 and the third space A34 may be easily performed.

Therefore, in the lens module 104 according to the present embodiment, even in the case in which the first lens 10 is rapidly heated or cooled by the temperature change of the external environment, a temperature change between the first lens 10 and the first space A12 may be significantly reduced through air circulation between the first space A12 to the third space A34. Specifically, the lens module 104 according to the present embodiment has a structure in which the air in the second space A23 and the third space A34 having a relatively large volume is circulated into the first space A12 or the air in the first space A12 is discharged to the second space A23 and the third space A34. Therefore, overheating or overcooling of the first lens 10 and the first space A12 may be more effectively suppressed or stabilized.

Next, a modified form of the lens module illustrated in FIG. 10 will be described with reference to FIGS. 11 and 12. For reference, since the lenses 10, 20, 30, 40, 50, 60, 70 of the lens modules 106 and 108, and the first spacing member 210 to the sixth spacing member 260, according to the modified example of FIGS. 11 and 12, are the same as or similar to the configuration of the above-described embodiment, detailed descriptions of these components are omitted.

Figure 11:
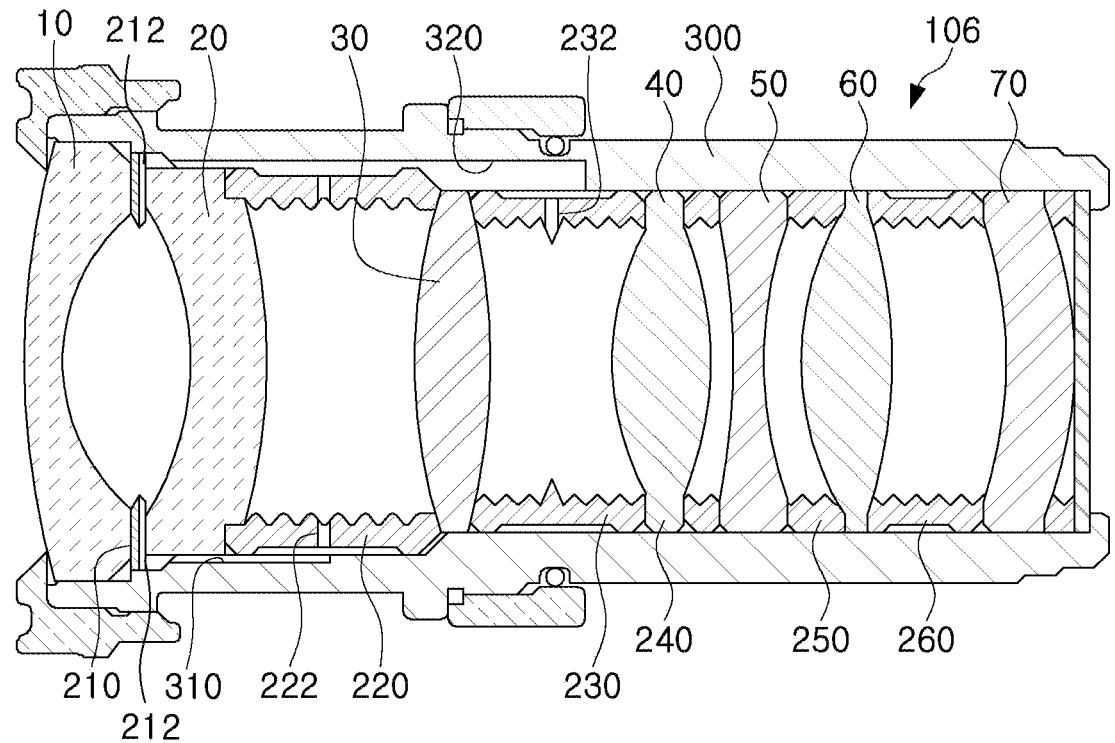
FIG. 11 and FIG. 12 illustrate cross-sectional views according to a modified form of the example lens module illustrated in FIG. 10.
Figure 12:
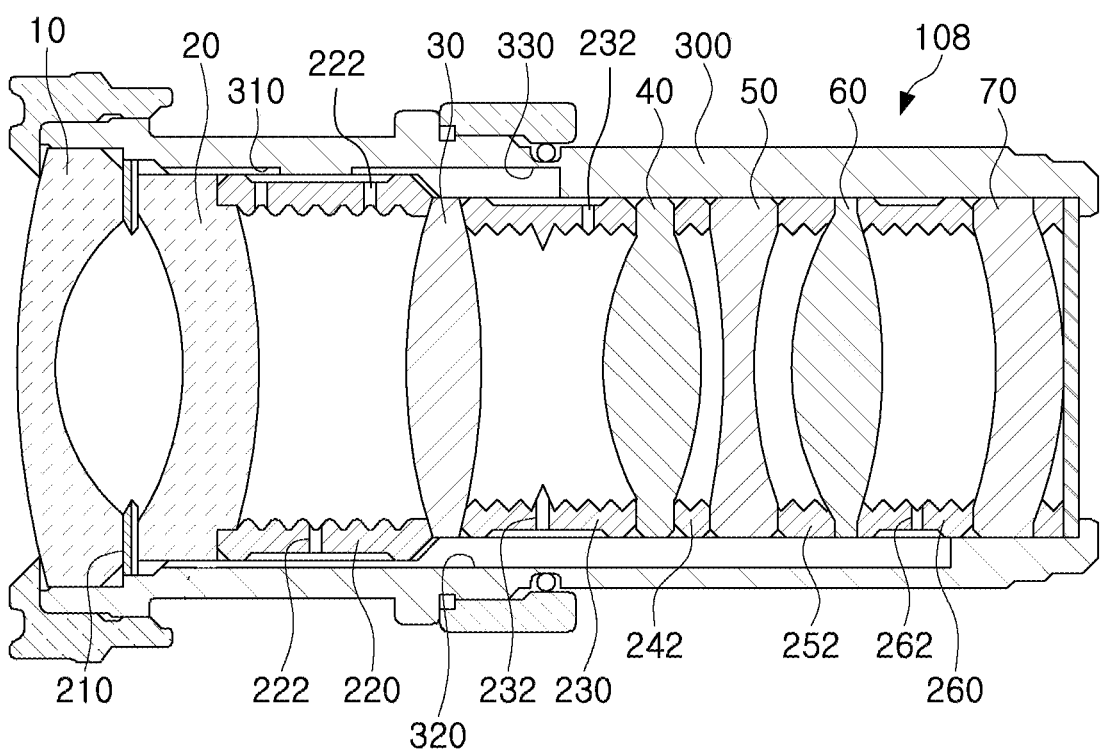

The lens modules 106 and 108 according to modified examples of FIGS. 11 and 12 may include a lens barrel 300 having a plurality of connection passages as illustrated in FIGS. 11 and 12. As a detailed example, the lens barrel 300 has a form including a first connection passage 310 and a second connection passage 320 as illustrated in FIG. 11, or may be configured in a form including a first connection passage 310, a second connection passage 320, and a third connection passage 330 as illustrated in FIG. 12.

The first connection passage 310 to the third connection passage 330 may be configured to be connected to a plurality of passages. For example, the first connection passage 310 may be formed to connect the first passage 212 and the second passage 222, and the second connection passage 320 may be formed to connect all of the first passage 212 to the third passage 232 (see FIG. 11). As another example, the first connection passage 310 is formed to connect the first passage 212 and the second passage 222, the second connection passage 320 is formed to connect the first to third passages 212 to 232 and the sixth passage 262, and the third connection passage 330 may be formed to connect the second passage 222 and the third passage 232.

In the example lens modules 106 and 108 according to the modified example configured as above, since the plurality of spaces A12, A23, and A34 are connected by various paths through the plurality of connection passages 310, 320, and 330, overheating or overcooling of the first lens 10 and the first space A12 may be effectively suppressed.

In an example, the lens and the lens module of the one or more examples may be included in an electronic device, in accordance with one or more embodiments. The electronic device may include the example imaging lens system according to one or more embodiments.

As set forth above, in accordance with one or more embodiments, a lens and a lens module in which constant performance may be exhibited even in a high temperature and high humidity environment may be provided.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A lens module, comprising:
a first lens, a second lens, and a third lens sequentially disposed from an object side to an imaging side;
a first spacing member, disposed between the first lens and the second lens, and having a first passage that extends in a direction that intersects an optical axis;
a second spacing member, disposed between the second lens and the third lens, and having a second passage that extends in the direction that intersects the optical axis; and
a lens barrel configured to accommodate the first lens, the second lens, the third lens, the first spacing member and the second spacing member, and configured to have a first connection passage disposed on an inner side surface and connected to the first passage and the second passage,
wherein the first lens has protrusions disposed on a flange portion at a first interval (G) in a circumferential direction and configured to form a lens passage connecting an object-side space and/or an image-side space thereof and an outer space of the flange portion, and
wherein 0.06<APsum/AL<0.1, where APsum is a sum of cross-sectional areas of the protrusions, and AL is a cross-sectional area of the first lens.

2. The lens module of claim 1, wherein the first passage is disposed at predetermined intervals in a circumferential direction of the first spacing member.

3. The lens module of claim 1, wherein a length of the first spacing member in the optical axis direction is less than a length of the second spacing member in the optical axis direction.

4. The lens module of claim 1, wherein a maximum distance from an image-side surface of the first lens to an object-side surface of the second lens is less than a maximum distance from an image-side surface of the second lens to an object-side surface of the third lens.

5. The lens module of claim 1, wherein an image-side surface of the first lens and an object-side surface of the second lens are respectively concave.

6. The lens module of claim 1, further comprising:
a fourth lens disposed on an image side of the third lens; and
a third spacing member disposed between the third lens and the fourth lens, and having a third passage that extends in a direction that intersects the optical axis.

7. The lens module of claim 6, wherein a maximum distance from an image-side surface of the first lens to an object-side surface of the second lens is less than a maximum distance from an image-side surface of the third lens to an object-side surface of the fourth lens.

8. The lens module of claim 6, wherein a second connection passage connecting the first passage and the third passage is provided on the inner side surface of the lens barrel.

9. The lens module of claim 6, wherein a third connection passage connecting the second passage and the third passage is provided on the inner side surface of the lens barrel.

10. An electronic device, comprising the lens module of claim 1.

* * * * *